United States Patent
D'Andrea et al.

(10) Patent No.: US 9,481,397 B2
(45) Date of Patent: Nov. 1, 2016

(54) MOTOR VEHICLE BODY PROVIDED WITH A STRUCTURE FOR RECEIVING AND DRAINING WATER

(71) Applicant: FCA ITALY S.p.A., Turin (IT)

(72) Inventors: Ernesto D'Andrea, Turin (IT); Sebastian Favaloro, Turin (IT); Gianfranco Del Nero, Turin (IT)

(73) Assignee: FCA Italy S.P.A., Turin (IT)

( * ) Notice: Subject to any disclaimer, the term of this patent is extended or adjusted under 35 U.S.C. 154(b) by 0 days.

(21) Appl. No.: 14/735,709

(22) Filed: Jun. 10, 2015

(65) Prior Publication Data

US 2015/0360732 A1    Dec. 17, 2015

(30) Foreign Application Priority Data

Jun. 11, 2014 (IT) .............................. TO2014A0469

(51) Int. Cl.
B62D 25/08    (2006.01)

(52) U.S. Cl.
CPC ........... B62D 25/081 (2013.01); B62D 25/082 (2013.01)

(58) Field of Classification Search
CPC .......................... B62D 25/081; B62D 25/082
USPC ....................................................... 296/208
IPC ..................................................... B62D 25/08
See application file for complete search history.

(56) References Cited

U.S. PATENT DOCUMENTS

| 4,466,654 A * | 8/1984 | Abe ..................... B62D 25/081 |
| | | 15/250.16 |
| 4,962,961 A * | 10/1990 | Ito ........................ B62D 25/081 |
| | | 296/192 |
| 2013/0229031 A1 | 9/2013 | Bisror et al. |
| 2014/0354011 A1 | 12/2014 | Delord |

FOREIGN PATENT DOCUMENTS

| FR | 2985689 A1 | 7/2013 |
| JP | S53100526 A | 9/1978 |
| JP | S5996066 A | 6/1984 |
| JP | 2005263002 A | 9/2005 |
| JP | 2008074202 A | 4/2008 |

OTHER PUBLICATIONS

Italian Application TO20140469, Search Report Issued Jan. 27, 2015 (8 pages).

* cited by examiner

Primary Examiner — Pinel Romain
(74) Attorney, Agent, or Firm — Sutherland Asbill & Brennan LLP

(57) ABSTRACT

A motor vehicle body is provided with a substantially vertical wall, which separates a lower zone of the passenger compartment from the engine compartment, and with a structure for receiving and draining water; such a structure protrudes forward into the engine compartment from an upper end of the substantially vertical wall and has an upper crosspiece shaped so as to define a manifold for receiving water; the upper crosspiece has a perforated intermediate portion and two opposite end portions provided with respective openings for draining water into drain passages; the structure further has a reinforcing crosspiece, which is arranged underneath the perforated intermediate portion for receiving some of the water and is shaped so as to define a channel which is elongated in the transversal direction so as to divert the water sideways and outwards.

9 Claims, 5 Drawing Sheets

MOTOR VEHICLE BODY PROVIDED WITH A STRUCTURE FOR RECEIVING AND DRAINING WATER

The present invention relates to a motor vehicle body provided with a structure for receiving and draining water, arranged in a rear zone of the engine compartment, underneath the windshield.

In such a zone, a manifold is normally provided, referred to in the jargon as "water box" or "under-windshield tank". Such a manifold is defined by a crosspiece arranged underneath the windshield and shaped so as to receive the rainwater. The manifold is also shaped so as to drain water sideways and outwards, where two drain conduits are provided, generally defined by substantially vertical sleeves. Such sleeves have the upper ends thereof secured to the manifold and extend downwards into the engine compartment, where they discharge the rainwater. Another crosspiece is generally provided underneath the above-mentioned manifold, which only has a reinforcing function.

BACKGROUND OF THE INVENTION

The known solutions of the above-described type, even if they are widely used, tend to lose their efficiency upon time. In fact, the passage defined by the sleeves is limited to the lower ends thereof, and tends to obstruct due to the presences of boughs, leaves, etc., which inevitably tend to deposit at the bottom of the manifold and enter the sleeves therefrom. When the sleeves lose their draining function, the rainwater overflows from the manifold and tends to infiltrate into the systems of the motor vehicle, e.g. in the aeration system.

Furthermore, it is preferred to avoid the drainage of the rainwater into the engine compartment, since such water, with particularly cold temperatures, tends to freeze and thus damage the electric members present in the engine compartment.

SUMMARY OF THE INVENTION

It is the object of the present invention to make a motor vehicle body provided with a structure for receiving and draining water, which allows to solve the set forth drawbacks in a simple, cost-effective manner, in particular by increasing the rainwater outflow rate and/or avoiding stagnations.

According to the present invention, a motor vehicle body provided with a structure for receiving and draining water is made as defined in claim 1.

BRIEF DESCRIPTION OF THE DRAWINGS

For a better understanding of the present invention, a preferred embodiment will now be described, by way of a non-limiting example, with reference to the accompanying drawings, in which.

DETAILED DESCRIPTION OF THE INVENTION

Figure 1:
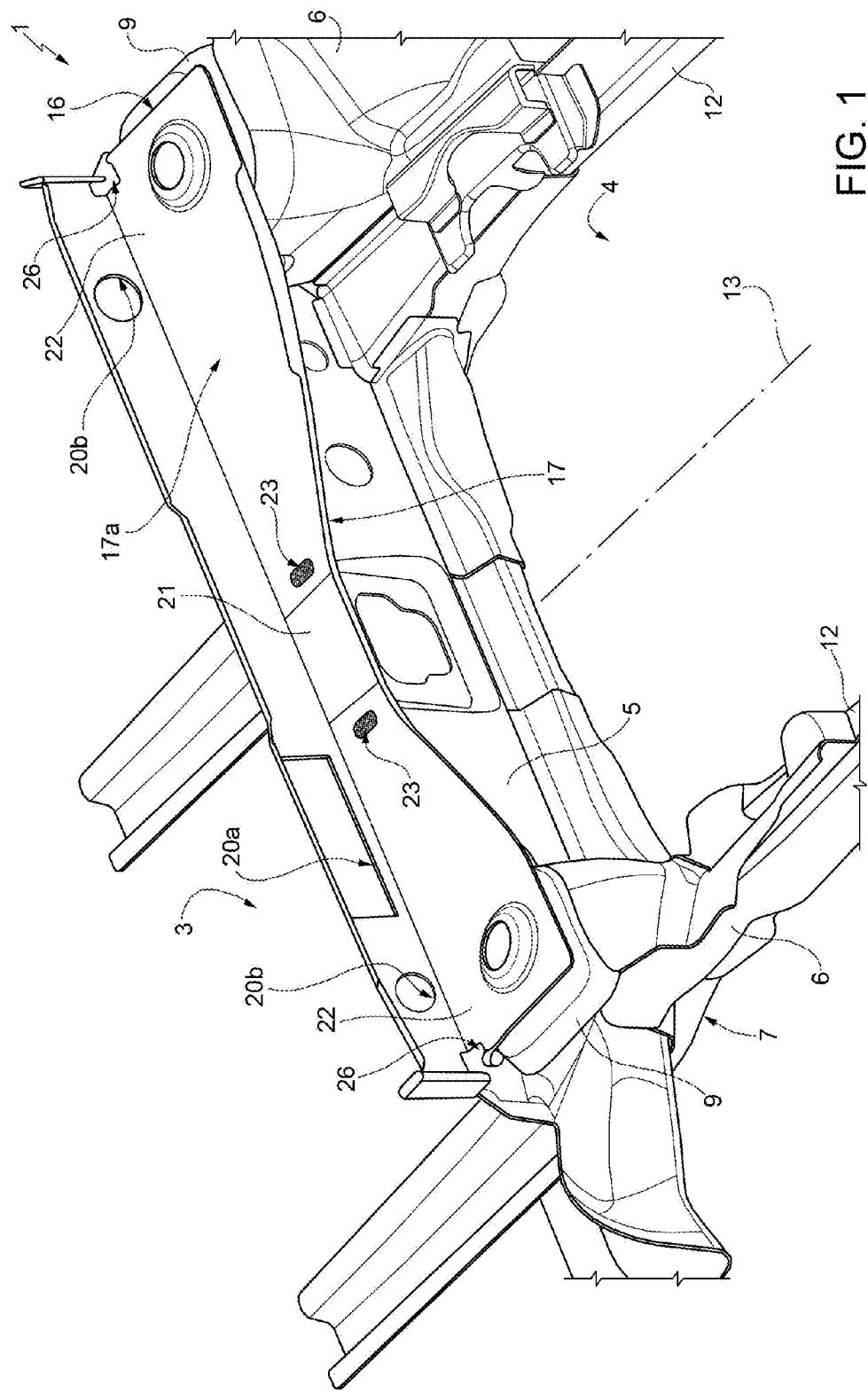
FIG. 1 shows a partial perspective view of a preferred embodiment of the motor vehicle body provided with a structure for receiving and draining water, according to the present invention.
Figure 2:
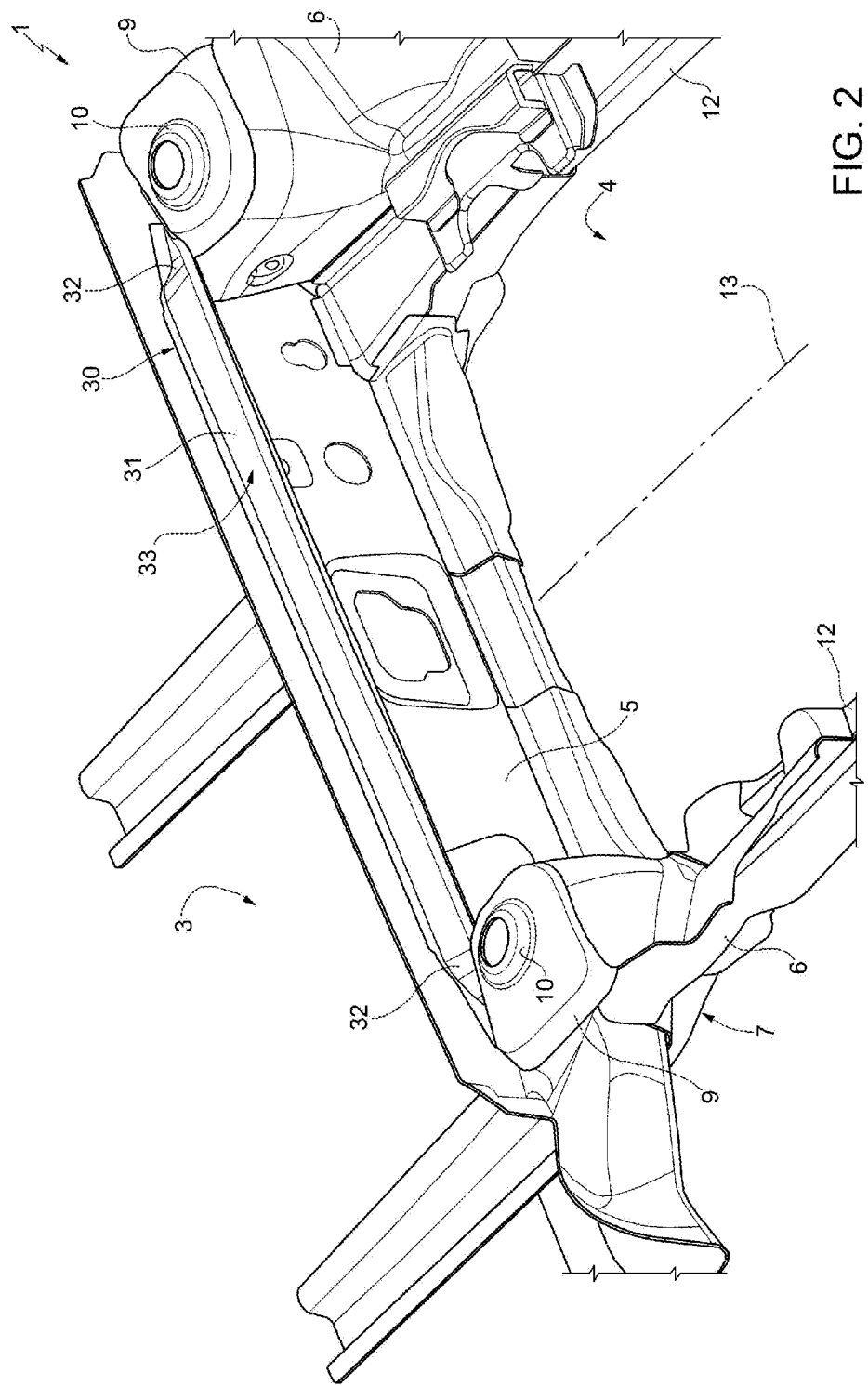
FIG. 2 is similar to FIG. 1 and shows the body in FIG. 1 in a slightly enlarged scale and with a component removed for clarity.

In FIGS. 1 and 2, reference numeral 1 indicates, as a whole, a body (partially shown) of a motor vehicle having a passenger compartment 3 and a front engine compartment 4. Body 1 is made of metal material and comprises a substantially vertical wall 5, which is usually referred to as "fireproof wall" and separates a lower zone of the passenger compartment 3 from the engine compartment 4. Body 1 (FIG. 1) defines two wheelhouses 7 which, in use, house the motor vehicle wheels, braking units, suspensions and front dampers (such components are not shown for simplicity).

In particular, with reference to FIG. 2, the wheelhouses 7 are defined at the top by respective plates 9, referred to in the jargon as "domes" or "upper posts" and defining respective attachment points, indicated by reference numeral 10, for securing, in a non-illustrated manner, the upper ends of the suspensions. At the same time, towards the engine compartment 4, the wheelhouses 7 are delimited by respective side walls 6, referred to in the jargon as "lower posts".

Body 1 further comprises two primary struts 12 (partially shown), which are substantially mutually symmetric with respect to a vertical centerline plane, are substantially parallel to a longitudinal axis 13, coincident with the forward direction of the motor vehicle, and protrude forward from wall 5, from a point slightly higher than a platform (not shown) which defines at the bottom the passenger compartment 3. In particular, the struts 12 are arranged to the side of the wheelhouses 7 and support the walls 6 in a known manner not described in detail.

Figure 3:
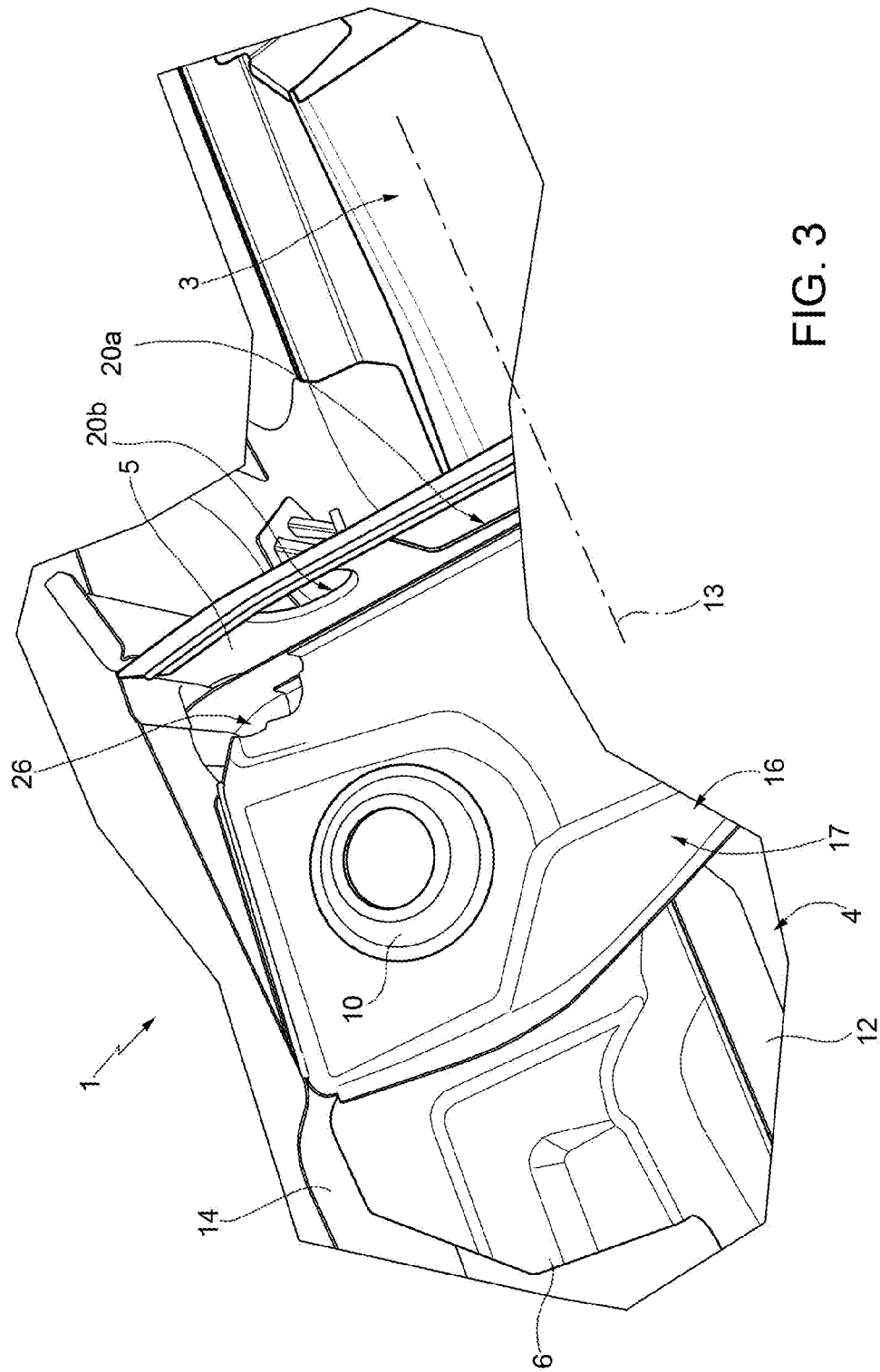
FIG. 3 is a top perspective view of a side portion of the structure for receiving and draining water in FIG. 1.

With reference to FIG. 3, body 1 further comprises two secondary struts 14 (one of which is partially shown), also substantially mutually symmetric with respect to the vertical centerline plane and substantially parallel to axis 13. In particular, the struts 14 are arranged above the wheelhouses 7, to the side of the plates 9 outwards of the engine compartment 4.

As it can be seen in FIG. 1, body 1 further comprises a structure 16 for receiving and draining water. Structure 16 is arranged in a rear zone of the engine compartment 4, i.e., immediately in front of wall 5, and underneath a windshield (not shown) of the motor vehicle.

Structure 16 comprises a crosspiece 17, which is elongated in the orthogonal direction to axis 13 and is shaped so as to define a manifold with a channel 17a, which is elongated in the transversal direction. By virtue of the position thereof, channel 17a is adapted to receive the rainwater descending from the windshield towards the engine compartment 4. At the top, channel 17a could be covered by a finishing member made of plastic material, arranged along the lower edge of the windshield and provided with openings for freely letting through the outer air and water into channel 17a.

In the jargon, crosspiece 17 is also referred to as "water box" or "under-windshield tank". In particular, as diagrammatically shown in FIG. 5, crosspiece 17 comprises a bottom wall 18 and two containment walls 20, 21, which extend upwards from the rear and front edges of wall 18, respectively. Wall 20 rests against an upper end of wall 5, whereby structure 16 protrudes forward from such an end. As it can be seen in FIG. 1, channel 17a has a rear opening 20a facing the passenger compartment 3 and defining a passage for the outer air which, in use, enters an aeration and conditioning system (not shown) to be conveyed into the passenger compartment 3. Channel 17a also has two rear openings 20b, facing the passenger compartment 3 and used for the passage of cables (not shown). Each of the openings 20a and 20b is obtained in wall 20 and/or in the upper end of wall 5. As it can be seen in FIG. 1, wall 18 comprises a central portion 21 and two end portions 22, which are opposite to each other and are arranged on the plates 9, respectively. The width of the portions 22 in a direction parallel to axis 13 (i.e., the distance between the walls 20, 21) is preferably larger than that of portion 21.

Portion 21 has two holes 23, which are through holes in the vertical direction so as to allow some of the rainwater to fall, are symmetric with respect to the vertical centerline plane, and have each a relatively wide passage section, so as to promote a relatively quick drainage of water. According to a variant (not shown), crosspiece 17 is provided with racks at the holes 23 to prevent possible debris (leaves, boughs, etc.) from falling.

Figure 4:
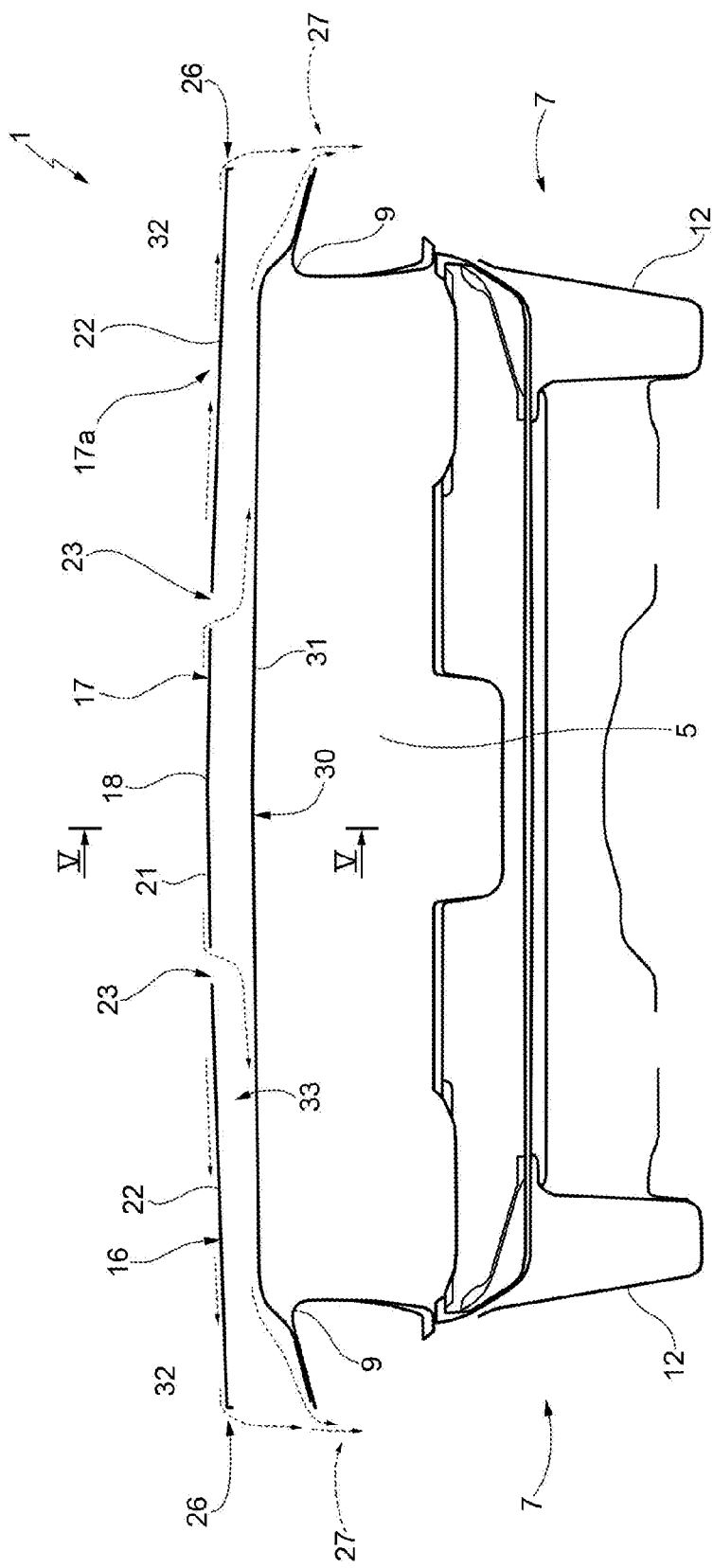
FIG. 4 is a diagram of the structure for receiving and draining water in FIG. 1.

With reference to FIGS. 3 and 4, the portions 22 have respective drain openings 26, provided above the wheelhouses 7 and communicating with the wheelhouses 7 themselves through substantially vertical passages 27, so as to drain the rainwater.

In particular, the openings 26 are defined, on the inner side, by recesses along the side edges of the portions 22 and, on the outer side, by side surfaces of the struts 14. Such recesses are obtained at respective vertices of crosspiece 17, in a position adjacent to wall 5.

Alternatively, the openings 26 are defined by through holes in the portions 22.

The portions 22 of wall 18 are preferably inclined downwards and laterally outwards so as to confer to wall 18 a slight slope, of the so-called "horseback" type, thus promoting the drainage of water from portion 21 towards the openings 26 under any distribution of the motor vehicle.

With reference to FIGS. 2 and 4, according to an aspect of the present invention, structure 16 further comprises a crosspiece 30, which comprises a bottom wall 31 arranged underneath portion 21 so as to receive the part of water falling through the holes 23, and is shaped so as to define a channel 33 which is elongated in the transversal direction and preferably ends, at its end, at the passages 27. Therefore, crosspiece 30 channels the water sideways and outwards, in addition to have a stiffening function of body 1. In order to perform such a reinforcing function to the best, crosspiece 30 connects the plates 9 to each other.

At the opposite side ends thereof, wall 31 advantageously ends with descending lengths 32 which are mutually symmetric and allow the water flow directly into the passages 27. Wall 31 is free from openings, except for possible holes (not shown) which are provided to carry out machining processes (e.g., a cataphoresis process) and which are however closed, for example by suitable plugs, when assembling body 1.

Figure 5:
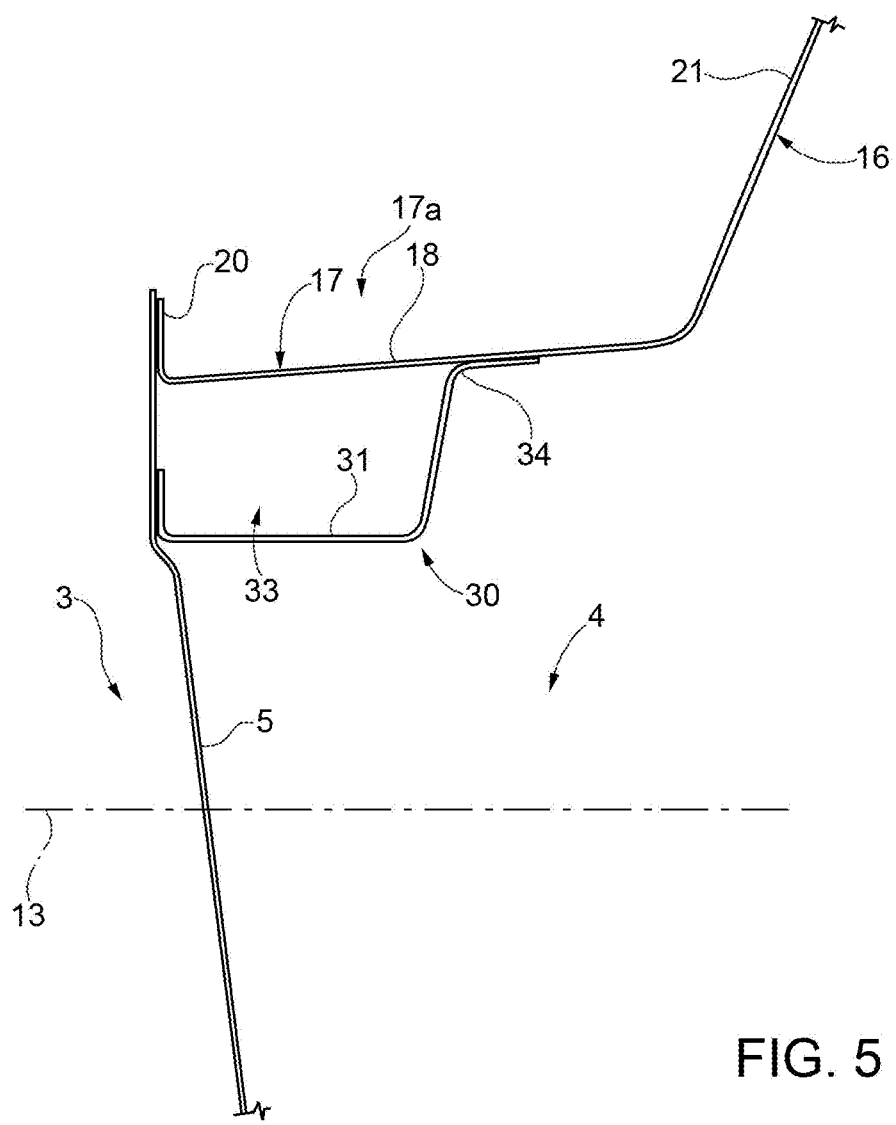
FIG. 5 is a cross-section, simplified and in enlarged scale, according to the section line V-V in FIG. 4.

As it can be seen in FIG. 5, crosspiece 17 preferably closes channel 33 at the top, which thus defines a conduit having a closed cross-section. In particular, crosspiece 30 comprises a front flap 34 which is watertight coupled to a lower surface of wall 18. In particular, flap 34 is spot-welded to wall 18 and is sealed by means of a sealing adhesive of the so-called "semi-structural" type.

At the rear side, crosspiece 30 is watertight coupled to wall 5, again by means of spot welding and sealing adhesive of the so-called "semi-structural" type. At the same time, wall 5 defines at least one part of conduit 33.

In use, as diagrammatically indicated in FIG. 4, a part of water falls through the holes 23 into conduit 33, which leads such water towards the passages 27. Thereby, two overlapping flows of water are formed, one into channel 17a and the other one into conduit 33. Once the water has reached the side ends of structure 16, it is channeled through the openings 26 into the passages 27 and, therefrom, into the wheelhouses 7.

From the above description, it is apparent that the channeling defined by crosspiece 30 allows the flow rate of the drained water to be increased, without increasing the dimensions of crosspiece 17 compared to the prior art solutions. As explained above, water is conveyed along two flows, an upper one in crosspiece 17 and the other one at the bottom in crosspiece 30, thus doubling the water flow rate which can be drained through the single crosspiece 17. The possibility of draining a larger water flow rate allows the drainage to be easier and the obstruction risks in structure 16 to be limited.

The fact that crosspiece 30 drains the water directly into the passages 27 allows a relatively simple structure 16 to be obtained and the use of additional components to be avoided. In particular, the drainage of water into the wheelhouses 7 avoids the use of drain sleeves, which, in the prior art solutions, tend to create obstruction problems. In addition, the elimination of the drain sleeves allows saving components, thus reducing costs.

Again by virtue of the drainage into the wheelhouses 7, the amount of water in the engine compartment 4 is reduced, whereby the risks of damaging the equipment, in particular the electric equipment, due to possible frosts are limited.

In addition, the solution is relatively simple and does not substantially alter the structural features of body 1 compared to widely tested, known solutions, since crosspiece 30 continues to serve a stiffening function. In particular, the crosspieces 17 and 30 form part of body 1, as stated above, whereby they are made of metal material and are not comprised of plastic components added to body 1.

Finally, from the above description, it is apparent that modifications and variations may be made to the structure 16 described and shown in the accompanying figures, without departing from the scope of protection of the present invention, as defined in the appended claims.

In particular, the number and configuration of the holes 23 could be different from those indicated by way of example; and/or conduit 33 could have an open cross-section, i.e., it could define a simple channel.

The invention claimed is:

1. Body of a motor vehicle having a front engine compartment, a passenger compartment and two front wheelhouses; the body comprising:
   a substantially vertical wall which separates a lower zone of said passenger compartment from said engine compartment;
   a structure for receiving and draining water; said structure protruding forward into said engine compartment from an upper end of said substantially vertical wall and comprising an upper crosspiece, which is adapted to be arranged below a windshield of the motor vehicle and is shaped so as to define a first channel, adapted to receive the water which slides down from said windshield towards said engine compartment and elongated in the transversal direction so as to divert the water sideways and outwards; said upper crosspiece comprising an intermediate portion and two opposite end portions;

wherein said end portions define respective openings for draining water into respective drain passages, and said intermediate portion has at least one hole to allow some of the water to fall from said first channel;

a reinforcing crosspiece arranged underneath said upper crosspiece;

wherein said reinforcing crosspiece forms part of said structure and defines a second channel, which is arranged underneath said hole and is elongated in the transversal direction so as to divert the water sideways and outwards.

2. A body according to claim 1, wherein said first channel has at least one rear opening for the air to pass from said first channel towards said passenger compartment.

3. A body according to claim 1, further comprising two plates which define, at the top, said wheelhouses; and wherein said end portions are arranged on said plates, respectively.

4. A body according to claim 1, further comprising two plates which define at the top said wheelhouses; and wherein said reinforcing crosspiece connects said plates to each other.

5. A body according to claim 1, wherein said second channel has two opposite side ends which directly lead into said drain passages, respectively.

6. A body according to claim 1, wherein said drain passages put said openings in communication with said wheelhouses, respectively.

7. A body according to claim 1, wherein said second channel is defined by a conduit having a closed cross-section.

8. A body according to claim 7, wherein said reinforcing crosspiece further comprises a front flap which is watertight coupled to a lower surface of said upper crosspiece.

9. A body according to claim 7, wherein said reinforcing crosspiece is watertight, and coupled to said substantially vertical wall.

* * * * *